Aug. 15, 1961 H. C. PAULSEN 2,996,263
WINDING MACHINE
Filed July 1, 1957 4 Sheets-Sheet 3
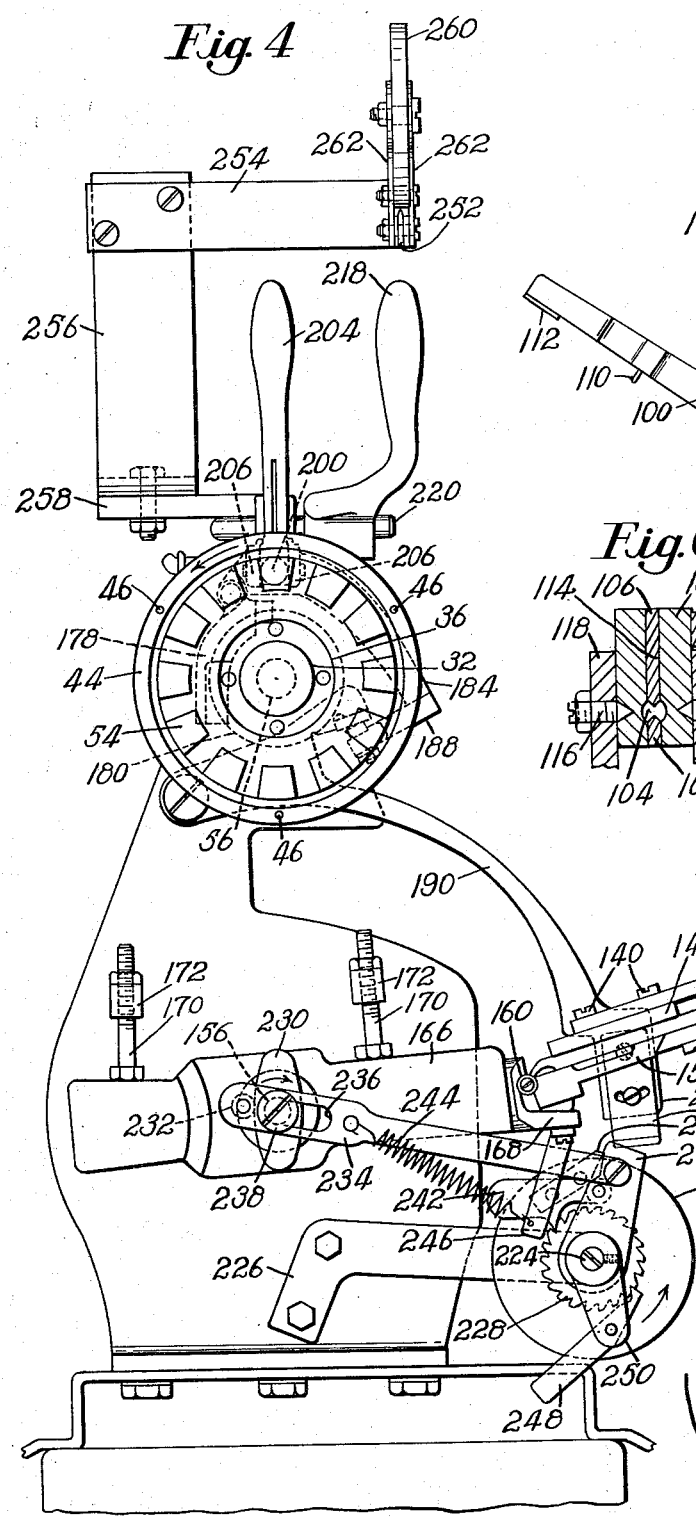
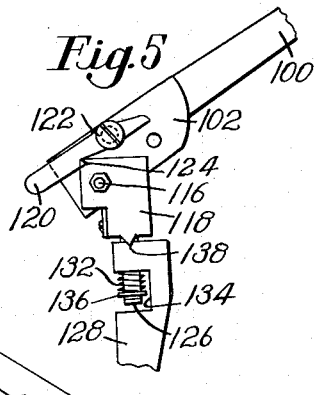
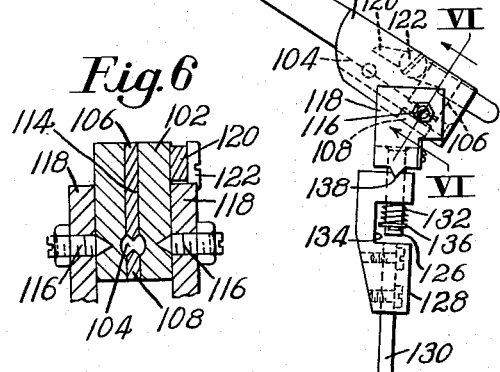
Inventor
Hans C. Paulsen
By his Attorney Aug. 15, 1961  H. C. PAULSEN  2,996,263
WINDING MACHINE
Filed July 1, 1957  4 Sheets-Sheet 4
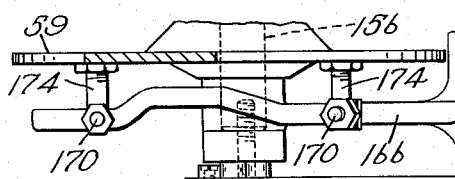
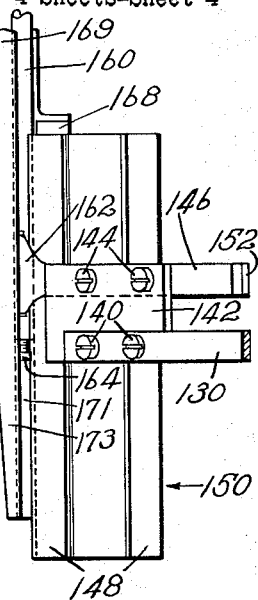
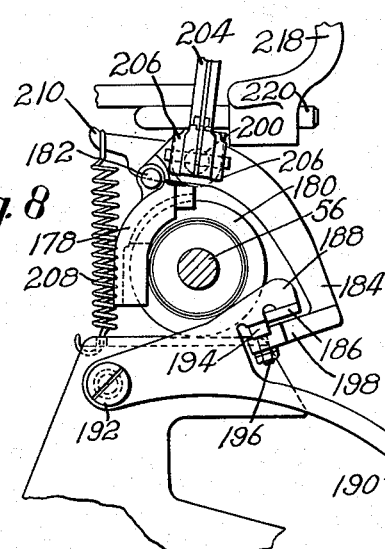
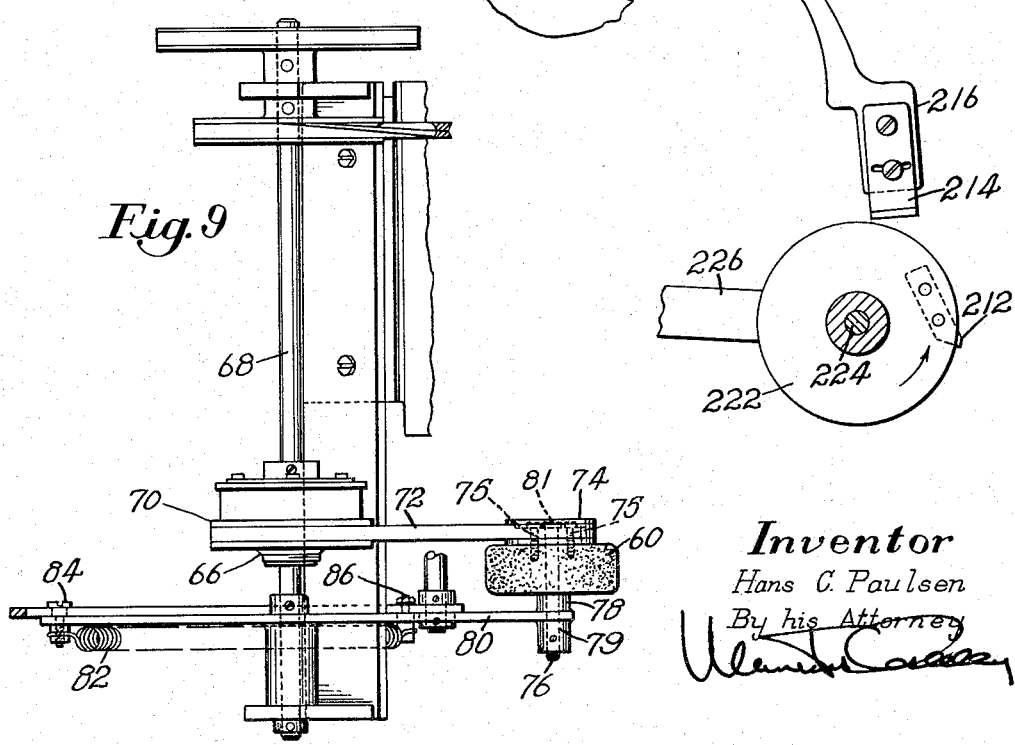
Inventor
Hans C. Paulsen
By his Attorney

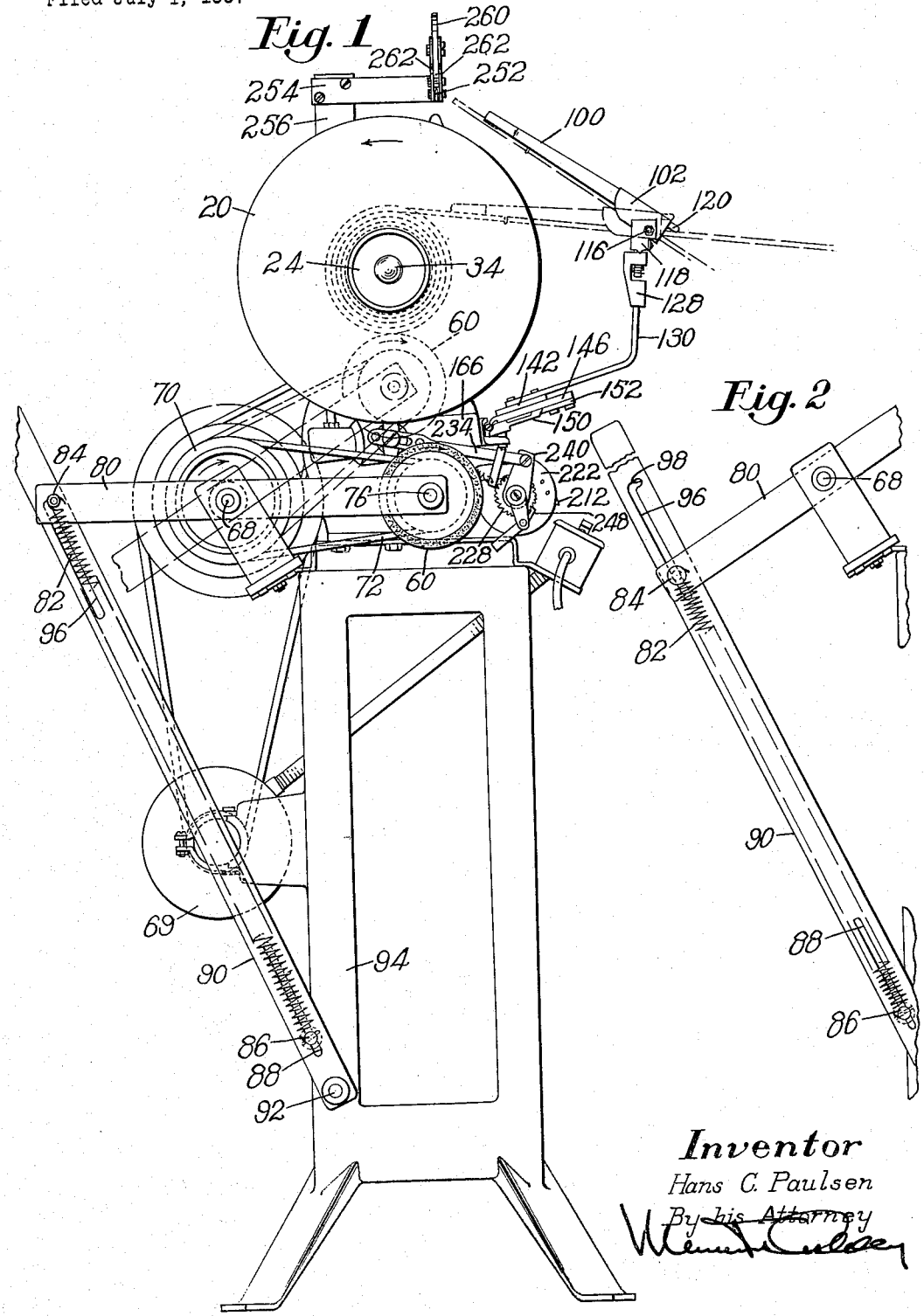

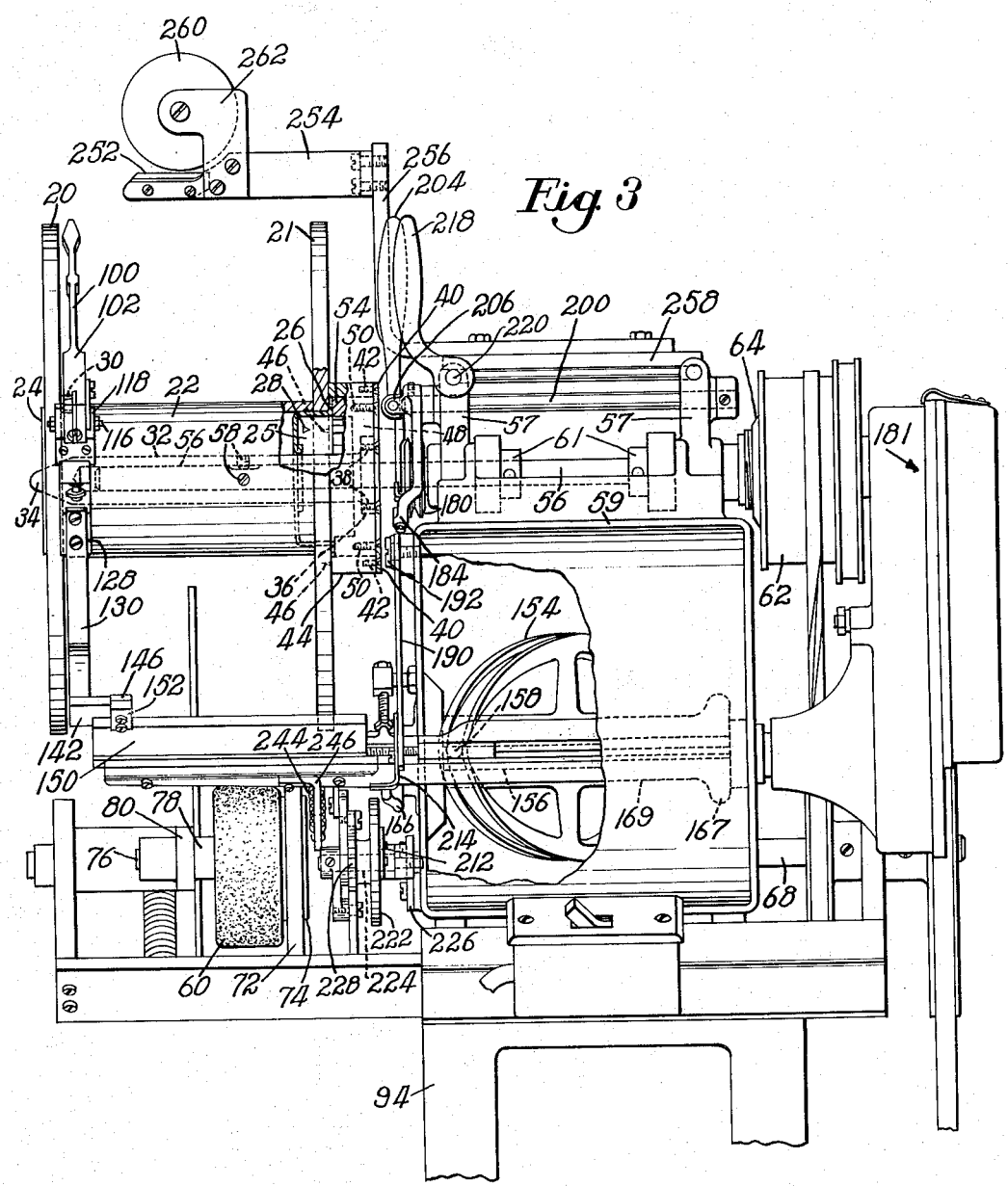

United States Patent Office 2,996,263
Patented Aug. 15, 1961

2,996,263
WINDING MACHINE
Hans C. Paulsen, Lexington, Mass., assignor to B.B. Chemical Co., Boston, Mass., a corporation of Massachusetts
Filed July 1, 1957, Ser. No. 669,089
2 Claims. (Cl. 242—39)

This invention relates to winding machines and is herein illustrated in its application to machines for winding plastic material in continuous rod shapes upon reels.

It is an object of the present invention to provide a winding machine which adapts itself readily to the winding of a continuous length of plastic rod fed to the winding machine from a source such, for example, as an extruding machine in which the rod is formed, or a machine through which the rod is fed after leaving the extruding machine such, for example, as a machine for applying a non-adhesive coating of powder to the rod preparatory to its packaging on a reel.

With the above and other objects in view, as will hereinafter appear, the present invention consists in the combination with a spindle which mounts a reel of means for effecting the rotation of the reel to wind a continuous length of material thereon. Suitable means is provided for causing the reel to rotate with the spindle and the reel is rotated in the first instance by a continuously driven shaft operating through a first slip clutch impositively to drive the spindle. After a body of windings has been built up on the reel, further rotation of the reel is effected by a driven rotor which acts by direct contact with the windings. The rotor is operated by the continuously driven shaft through a second slip clutch which impositively drives the rotor with a force greater than that which is applied to the spindle through the first slip clutch. A suitable traverse guide member directs a length of material to the reel and suitable means is provided for causing the traverse guide member to be driven by the rotation of the spindle. For counting the number of courses on the reel, a counting means is operated by the rotation of the spindle. Upon completion of the counting operation a brake member arrests the rotation of the spindle to terminate the winding operation.

The invention will now be described with reference to the accompanying drawings and pointed out in the appended claims.

In the drawings,

FIG. 1 is a left side elevation of a machine embodying the features of the present invention;

FIG. 2 is a left side elevation illustrating in their operative positions certain parts shown in FIG. 1 in their rest positions;

FIG. 3 is a front elevation of the head of the machine with certain parts broken away to disclose underlying parts;

FIG. 4 is a left side elevation of the head of the machine with the reel removed from the spindle;

FIG. 5 is a view in right side elevation illustrating certain parts shown in FIG. 4;

FIG. 6 is a section taken on the line VI—VI of FIG. 4;

FIG. 7 is a plan view illustrating a portion of the traverse mechanism;

FIG. 8 is a view in left side elevation illustrating the brake mechanism; and

FIG. 9 is a plan view illustrating parts of the mechanisms for rotating the reel.

The invention is illustrated in the drawings as embodied in a machine for winding on reels reelable material of suitable dimensions, particularly solid, flexible, adhesive thermoplastic material in rod shape.

The illustrated machine is provided with a spindle for mounting a reel, a suitable chuck mechanism for causing the reel to rotate with the spindle, a driven rotor constructed and arranged to rotate the reel by engagement with the windings thereon, and separate slip clutch mechanisms for driving the rotor and the spindle respectively. A suitable traverse guide mechanism is provided for guiding to the reel the material to be wound thereon, and a brake is operated automatically to arrest the rotation of the spindle after a predetermined number of courses have been wound upon the reel. A suitable cutter mechanism is provided for severing the last winding from the supply after the reel has been filled. The chuck mechanism for causing the reel to rotate with the spindle is of a type permitting the reel to be conveniently removed manually from the spindle after the last winding has been severed from the supply.

Referring to FIG. 3, the illustrated reel comprises identical annular end plates 20 and 21, made of cardboard or the like, a cylindrical hub 22, also made of cardboard, and means for fastening the end plates to the hub comprising identical cup shaped members 24 and 25 made of material responsive to magnetomotive force. The members 24 and 25 have outturned flanges 26 which engage the outer surfaces of the end plates and have spurs 28 stamped outwardly from their barrel portions for gripping engagement with the inner surface of the hub 22. At the junction of the hub 22 and the end plate 20 there is mounted a clip 30 for holding the leading end of the material to be wound on the reel. The illustrated clip is generally U-shape and, as shown in FIG. 3, is so disposed that its base lies against the inner surface of the end plate 20 while one arm is confined between the hub 22 and the member 24 and the other arm lies parallel to the outer surface of the hub and is spaced therefrom for engagement with the leading end portion of the material to be wound on the reel. Each of the members 24, 25 is provided with a circular axial opening to provide for the mounting of the reel on a tubular spindle 32 having a solid conoidal outer end portion 34 which facilitates the mounting of the reel on the spindle. The inner end portion of the spindle has an outturned flange 36 to which there is secured by screws 38 an annular plate 40. Secured to the peripheral portion of the plate 40 by screws 42 is a driving member on ring 44 having a plane annular surface which engages the outer surface of the end plate 21. Projecting at regular intervals from the plane annular surface of the ring 44 are points 46 upon which the end plate 21 of the reel is impaled to provide for the transmission of the rotation of the spindle 32 to the reel. In order to prevent inadvertent separation of the reel from the points 46 a permanent magnet 48 annular in shape is constructed and arranged to fit into the space between the inner wall of the ring 44 and the edge face of the flange 36, said magnet being secured to the plate 40 by screws 50. The illustrated magnet is characterized by an annular arrangement of segmental bosses one of which is identified in FIG. 4 by the numeral 54. The bosses are uniformly spaced from each other and have their flat end faces disposed in a plane common to the exposed annular surface of the ring 44. The outturned flange of the member 25 is brought into contact with the bosses 54 when the reel is mounted upon the spindle 32. The magnet 48 holds the reel against movement endwise of the spindle 32 during the winding operation but does not offer any serious resistance to the removal of the reel from the spindle upon the completion of the winding operation. The spindle 32 is mounted on the left end portion of an arbor 56 on which it is adjustable endwise in order to vary the position of the reel relatively to a traverse guide mechanism hereinafter described. The spindle is secured to the arbor by set screws 58 seated in suitable grooves in the arbor. The arbor is journaled in bearings in standards 57 projecting upwardly from a housing 59 secured to the upper portion of a pedestal 94. The arbor is held against endwise movement by collars 61 secured thereto and arranged to bear against the standards 57.

The reel is rotated by an electric motor 69 operating through impositive power transmission means herein illustrated as magnetic slip clutch assemblies. During the winding of the first course on the reel the reel is rotated by the actuation of the arbor 56 (FIG. 3) through a magnetic slip clutch mechanism associated therewith. After the winding of the first course on the reel and particularly during the winding of the outer courses thereon the reel is rotated largely by a rotor 60 which acts against the windings on the reel and is actuated by the motor 69 through a second magnetic slip clutch mechanism hereinafter described. The rotor 60 operates by frictional contact with the windings on the reel, and to that end, is provided with a frictional peripheral surface made of rubber or the like. It will be seen that the use of such a rotor in the winding operation facilitates the maintenance of a relatively constant peripheral speed at the winding point. In winding the first course on the reel it is necessary to rotate the reel by the operation of the arbor 56 because the frictional peripheral surface of the rotor 60 is relatively ineffective against the smooth surface of the hub 22 of the reel.

In the illustrated organization the arbor 56 is actuated by the motor 69 through a magnetic slip clutch mechanism comprising a driving element herein illustrated as a pulley 62 freely mounted on the arbor 56 and a driven element 64 fixed to the arbor and adjustable thereon relatively to the pulley 62 in order to vary the magnetomotive force of the clutch. Referring to FIG. 9, the rotor 60 is driven through a similar magnetic slip clutch comprising a driving element 66 fixed to a counter shaft 68 which is actuated by a suitable belt driven by the electric motor 69. In this case the driving element 66 operates a pulley 70 which rotates freely relatively to the counter shaft 68 and is adjustable endwise of the shaft relatively to the driving element. The pulley 70 drives the rotor 60 through a belt 72 which engages a pulley 74 secured by screws 75 to the rotor. The assembly comprising the rotor and the pulley are mounted to rotate freely on a short shaft 76 fixed in bosses 78 and 79 at opposite sides of the forward end portion of a lever 80 fulcrumed on the counter shaft 68. The rotating assembly is held against movement endwise of the shaft 76 by the boss 78 and a head 81 at the right end of the shaft. Referring to FIG. 1, the rotor 60 is normally held in its operating position, indicated therein by broken lines, by a spring 82 anchored at its upper end to a bolt 84 fixed in the rear portion of the lever 80 and at its lower end to a bolt 86 adjustably mounted in a slot 88 in the lower portion of an arm 90 pivotally mounted at 92 in the lower portion of the machine standard 94. The bolt 84 at the rear end of the lever 80 extends through a longitudinal slot 96 formed in the arm 90. To provide for the retention of the rotor 60 in its rest position, indicated in full lines in FIG. 1, the slot 96 has at its upper extremity a right angular extension 98 (FIG. 2) in which the bolt 84 is retained by the tension of the spring 82 when the machine is at rest. When it is desired to advance the rotor into operating position the arm 90 is manually swung in a clockwise direction, as seen in FIG. 1, to cause the bolt 84 to register with the slot 96 whereupon the spring 82 swings the lever 80 in a counterclockwise direction, as seen in FIG. 1, to elevate the rotor into operating engagement with the windings on the reel.

Referring to FIGS. 4 and 5, the illustrated traverse guide mechanism comprises an arm 100 to which is imparted by mechanism now to be described reciprocating movement endwise of the hub 22 of the spindle between the end plates 20 and 21. The arm 100 has an enlarged end portion 102 the lower portion of which is drilled longitudinally to provide a passageway 104 for a flexible rod being transmitted to the reel. As shown in FIG. 6, the flexible rod is provided with diametrically opposite V grooves extending longitudinally thereof and the arm 100 has mounted therein plates 106 and 108 having beveled end portions extending into the passageway 104 for engagement in the grooves in the rod thereby to hold the rod against torsional movement and to present it to the reel with the grooves spaced vertically from each other. At its free end the arm 100 is provided with laterally spaced pins 110 projecting downwardly therefrom for guiding engagement with the flexible rod, and the extremity of the arm is provided with a beveled tongue 112 which bears in the upper groove in the flexible rod in order to insure the desired disposition of the rod on the hub of the reel. As shown in FIG. 6, the plates 106 and 108 are secured between the walls of a narrow notch 114 formed in the enlarged end portion 102 of the arm. The enlarged end portion of the arm is pivotally mounted on pivot pins 116 mounted in a yoke 118. The arm 100 in its rest position is tilted upwardly, as shown in FIGS. 4 and 5 and is retained in this position by a latch member 120 pivotally mounted on a headed screw 122 projecting from the right side of the end portion 102 and held by gravity in its position illustrated in FIG.5 in which a tooth 124 formed in the latch member is seated in a suitable recess formed in the yoke 118 thereby holding the arm 100 against downward movement. The latch member 120 is extended beyond the forward end portion of the arm 100 to provide for its convenient manual disengagement from the yoke 118 in order to permit the arm 100 to swing downwardly into its operating position. In order to permit the arm 100 to be swung laterally into a position remote from the reel, thereby to facilitate the removal of a loaded reel from the spindle 32 and its replacement by an empty reel, the yoke 118 has fixed in its base portion a pin 126 arranged to extend vertically downwardly from the yoke for swiveling engagement in a supporting block 128 secured to the vertically disposed end portion of a bent arm 130 forming a portion of the carrier of the traverse guide assembly. The arm 100 is normally held in its orientation shown in FIG. 4 in which its free end portion is arranged to register with a reel mounted on the spindle 32. Such orientation of the arm is maintained by a spring 132 surrounding the lower end portion of the pin 126. As shown in FIG. 4, the block 128 is provided with a recess 134 into which the lower portion of the pin 126 extends, the spring 132 being confined between the upper wall of the recess and a suitable washer 136 mounted on the pin and supported by a cotter pin mounted therein. The orientation of the arm 100 is determined by the engagement of V-shaped extensions 138 of the yoke 118 in suitable notches in the upper portion of the block 128. The downwardly inclined lower end portion of the bent arm 130 is secured by headed screws 140 to a plate 142 which is part of a sliding assembly which moves horizontally to cause the guide arm 100 to traverse the hub of the reel. Referring to FIG. 7, the plate 142 is secured by headed screws 144 to an inclined arm 146 which rests against coplanar marginal lands 148 of a rail 150 on which the sliding assembly travels. The arm 146 is positioned relatively to the rail and held against upward movement therefrom by a keeper plate 152. As shown in FIG. 4, the left edge face of the keeper plate has an undercut bevel constructed and arranged for engagement with a complementally beveled edge face of the rail 150. The traverse guide assembly is mounted on a carrier comprising two parallel arms 166 and 167 (FIG. 3) connected together at their forward ends by a crosshead 169. The arms are freely mounted for angular movement on a shaft 156. For actuating the traverse guide assembly to cause the guide arm 100 to traverse the hub of the reel, a cam 154 fixed to the shaft 156 engages a roll 158 carried by a horizontal shaft 160 and imparts sliding movement to the shaft.

The shaft is slidably mounted in a suitable groove 171 extending longitudinally of the crosshead 169 and continued longitudinally of an arm 173 extending to the left from the crosshead, the shaft being retained within the groove by means hereinafter described. The cam shaft 156 is actuated by the pulley 62 through reduction gearing mounted in a housing 181. The rate of rotation of the cam shaft is such that it turns 180° while a complete course is wound upon the reel, and the cam 154 is so constructed that during each complete rotation of the cam shaft it advances the guide arm 100 from one wall of the reel to the opposite wall and back to the point of beginning and thus coordinates the motion of the guide arm with the normal movement of the guided portion of the rod endwise of the reel during the winding operation. Referring to FIGS. 4 and 7, the left end portion of the sliding shaft 160 is recessed to receive an elongated head 162 extending downwardly from the lower end portion of the arm 146. The head 162 is secured in the recess by a set screw 164 mounted in the left end portion of the shaft 160 and arranged axially thereof. As shown in FIGS. 4 and 7, the arm 173 is extended laterally to provide a shelf 168 to which the rail 150 is secured. In order to retain the sliding shaft 160 in the groove 171 the adjacent portion of the rail 150 has formed therein a concave surface concentric to the groove 171 and providing a second bearing for the sliding shaft. The traverse assembly and the sliding shaft 160 are adjustable as a unit about the axis of the cam shaft 156 in order to vary the position of the guide arm 100 relatively to the reel as required. In the illustrated organization such adjustment is effected by angular movement of the arm 166. In order to secure the arm in adjusted position two abutment screws 170 (FIG. 4) are arranged to engage the upper edge face of the arm 166 at opposite sides of the cam shaft 156. The screws 170 have threaded engagement respectively in cylindrical heads 172. As shown in FIG. 7, the heads are provided with radial stems 174 fixed in the left wall of the housing 59.

When it is necessary to adjust the reel in order to bring it into registration with the path of movement of the traverse guide arm 100, the set screws 58 are disengaged from the reel arbor 56 in order to permit adjustment of the spindle 32 within the range of the grooves in which the set screws are seated, the grooves being long enough to permit any foreseeable adjustment of the spindle.

After the reel has been fully wound a suitable brake mechanism operates to arrest the rotation of the arbor 56. After the arbor has been arrested the rotor 60 (FIG. 1) is disengaged from the windings on the reel by manually swinging the lever 80 in a clockwise direction, as seen in FIG. 1. The rotor is locked in its retracted position illustrated in FIG. 1 by bringing the bolt 84 at the left end of the lever into registration with the angular extension 98 of the slot 96 and permitting the arm 90 to swing in a counterclockwise direction as seen in FIG. 1 in order to cause the bolt to be seated in the extremity of the extension 98 thus to hold the lever 80 against return movement. After the rotation of the arbor 56 is arrested by the brake mechanism the driving element of the magnetic clutch on the arbor operates idly until the brake is released for the beginning of the next winding operation. Referring to FIG. 8, the illustrated brake mechanism comprises a segmental brake shoe 178 constructed and arranged to operate in a concentric groove formed in the periphery of a brake drum 180 fixed to the arbor 56. The brake shoe depends from a pivot pin 182 fixed in an arcuate lever 184 and in its retracted position is maintained by gravity in its angular relation to the lever illustrated in FIG. 8. During the operation of the machine the brake shoe is held retracted by a latch plate 186 secured to an upwardly inclined extension 188 of a latch lever 190 pivotally mounted to swing on a fixed screw 192. The latch plate engages the head 194 of a bolt 196 secured in an angular extension 198 of the lever 184. Referring to FIG. 3, the lever 184 is fixed to the left end portion of a shaft 200 journaled in the standards 57 extending upwardly from the housing 59. For rotating the shaft 200 in order to disengage the brake shoe 178 from the drum 180 a handle 204 is mounted between ears 206 at the left end of the shaft 200. Referring to FIG. 8, the shaft 200 is swung in a clockwise direction by the operation of the handle 204 to bring the lever 184 into its latched position. After the latch is automatically released, by means hereinafter described, a spring 208 swings the lever 184 in a counterclockwise direction, as seen in FIG. 8, to advance the shoe 178 into braking engagement with the drum 180. At its upper end the spring 208 is anchored to an extension 210 of the lever 184 and at its lower end the spring is anchored in the machine frame. The latch plate 188 is automatically disengaged from the bolt 196 after the completion of the winding operation by the engagement of a cam member 212 with a plate 214 mounted on a rectangular extension 216 of the latch lever 190. The engagement of the cam member with the plate 214 swings the latch lever in a counterclockwise direction, as seen in FIG. 8, thus disengaging the latch plate 186 from the head 194 and permitting the spring 208 to swing the lever 184 in a counterclockwise direction in order to bring the brake shoe into braking engagement with the drum 180. In order to facilitate the operation of the handle 204 by a manipulation of the fingers, a fixed handle 218 is provided and arranged close enough to the handle 204 to enable the operator to grasp both handles simultaneously with one hand. The handle 218 is arranged in upright position and fixed to a pin 220 which is secured in the left standard 57 (FIG. 3).

In order to cause the brake to operate automatically to arrest the rotation of the spindle after the reel has been filled, means is provided for automatically counting a predetermined number of courses as they are wound upon the reel and for causing the operation of the brake mechanism when the last of the predetermined number of courses has been wound. In the illustrated organization a suitable actuating mechanism is provided for advancing the cam member 212 step by step as the reel is filled course by course until, at the end of the winding of the final course, the operation of the actuating mechanism brings the cam member into engagement with the plate 214 thereby effecting the operation of the brake mechanism as above described. In the illustrated organization the cam member is advanced by mechanism now to be described which is actuated by the rotation of the cam shaft 156. Referring to FIG. 3, the cam member 212 is fixed to a disk 222 mounted to rotate on a shaft 224 fixed to an arm 226 mounted on the left wall of the cam housing 59. Fixed to the hub of the disk 222 is a ratchet wheel 228 having twenty-two teeth, one for each course to be wound upon the reel. The ratchet wheel is advanced one tooth at a time by the operation of a cam 230 (FIG. 4) fixed to an extension of the shaft 156 and constructed and arranged to advance the ratchet wheel one tooth for each 180° of rotation of the shaft 156. The cam 230 acts against a cam roll 232 pivotally mounted at the extremity of the enlarged end portion of an arm 234. The arm is provided with a slot 236 through which extends the end portion of the shaft 156 and a headed screw 238 is mounted in the extremity of the shaft in order to hold the arm 234 in contiguous relation to the cam 230. At its right end the arm 234 is pivotally connected to the upper end portion of an arm 240 freely mounted on the shaft 224. A detent 242 pivotally mounted on the arm 240 is constructed and arranged to engage the ratchet wheel 228 and to advance the ratchet wheel one tooth for each operation of the cam 230. After each operation of the cam a spring 244 retracts the arm 240 and returns the detent 242 to its starting position. At its left end the spring is anchored to a pin on the arm 234 and at its right end the spring is anchored in the lower portion of an arm 246 fixed to the arm 166. In order to hold the ratchet wheel against clockwise movement during the retraction of the detent 242, a detent 248 is pivotally mounted on the lower end portion of an arm 250 fixed to and depending from the shaft 224.

In the operation of the illustrated machine a reel is mounted on the spindle 32 and impaled upon the points 46 projecting from the ring 44. The end of the rod to be wound upon the reel is then inserted between the clip 30 and the hub 22 of the reel whereupon the handle 204 is operated to release the brake, the brake being held released by the engagement of the latch plate 186 (FIG. 8) with the head 194 of the bolt 196. Upon the release of the brake the rotation of the arbor 56 (FIG. 3) is initiated by the continuously driven pulley 62 acting through the magnetic slip clutch mechanism hereinbefore described, the rotor 60 at this time being in its retracted position, illustrated in FIG. 1. At the beginning of the winding operation the guide arm 100 is swung into its position of registration with the rod indicated by full lines in FIG. 1, and the latch 120 is released to permit the guide arm to be moved downwardly into its guiding relation to the rod indicated by dotted lines in FIG. 1. The arm 90 is then swung upwardly to release the bolt 84 from the slot 98 (FIG. 2) thus to permit the spring 82 to swing the lever 80 in a counterclockwise direction, as seen in FIG. 1, thereby to bring the rotor 60 into engagement with the windings on the reel. The operation of the machine then proceeds automatically until twenty-two courses have been wound upon the reel whereupon the cam 212 (FIG. 8) engages the member 214 and swings the latch lever 190 in a counterclockwise direction as seen in FIG. 8 to disengage the latch plate 186 from the head 194 of the bolt 196 thus permitting the spring 208 to advance the brake shoe 178 into its braking position, illustrated in FIG. 4. The guide arm 100 is then lifted into its latched position illustrated in FIG. 4 and swung out of its position of alinement with the reel. The wound rod is then severed from its source by a suitable cutting means whereupon the free end portion of the wound rod is manually inserted between the wall of the reel and the windings and the reel is removed from the spindle 32 for packaging.

For severing the wound rod from its source the illustrated machine is provided with a cutting means comprising a fixed horizontal blade 252 (FIG. 3) secured to a horizontal arm 254 fixed to the upstanding portion of a bent angle plate 256 secured to a fixed horizontal plate 258 (FIG. 4). To facilitate the cutting operation a rotor 260 is arranged in tangential relation to the blade 252 and pivotally mounted between angle plates 262 secured to and projecting upwardly from the arm 254.

Having thus described my invention, what I claim as new and desire to secure by Letters Patent of the United States is:

1. In combination, a spindle constructed and arranged to receive a reel upon which a length of material is to be wound, means for causing the reel to rotate with the spindle, a continuously driven shaft, a first slip clutch through which said shaft impositively drives the spindle and a reel thereon, a rotor for driving the spindle and a reel thereon by direct contact with windings on the reel, a second slip clutch through which said shaft impositively drives the rotor with a force greater than the force applied to the spindle through the first slip clutch so that the driving of the spindle and a reel thereon is effected and controlled by the rotor after an initial body of windings has built up on the reel, a traverse guide member for directing a length of material to the reel, means whereby the traverse guide member is driven by the rotation of the spindle, means for counting a predetermined number of courses on the reel, means whereby the counting means is operated by the rotation of the spindle, a brake member constructed and arranged to arrest the rotation of the spindle, and means operating upon the completion of the counting operation for causing the operation of the brake member.

2. In combination, a spindle constructed and arranged to receive a reel upon which a length of material is to be wound, means for causing the reel to rotate with the spindle, a continuously driven shaft, a first slip clutch through which said shaft impositively drives the spindle and a reel thereon, a rotor for driving the spindle and a reel thereon by direct contact with windings on the reel, a second slip clutch through which the driven shaft impositively drives the rotor with a force greater than the force applied to the spindle through the first slip clutch so that the driving of the spindle and the reel thereon is effected and controlled by the rotor after an initial body of windings has built up on the reel, a traverse guide member for directing a length of material to the reel, a first cam operated by the spindle, means whereby the traverse guide member is operated by the first cam, means for counting a predetermined number of courses on the reel, a second cam operated by the spindle, means whereby the counting means is operated by the second cam, a brake member constructed and arranged to arrest the rotation of the spindle, and means operating upon the completion of the counting operation for causing the operation of the brake member.

References Cited in the file of this patent

UNITED STATES PATENTS

| | | |
|---|---|---|
| 801,941 | Wardwell | Oct. 17, 1905 |
| 868,268 | Holmes et al. | Oct. 15, 1907 |
| 1,067,235 | Barrett | July 15, 1913 |
| 1,132,076 | Delaski | Mar. 16, 1915 |
| 1,843,436 | Wood | Feb. 2, 1932 |
| 1,867,596 | Roseman | July 19, 1932 |
| 1,994,403 | Reiners | Mar. 12, 1935 |
| 2,292,929 | Crebbs | Aug. 11, 1942 |
| 2,461,857 | Tornberg | Feb. 15, 1949 |
| 2,563,398 | Courtney | Aug. 7, 1951 |
| 2,729,051 | Clarkson | Jan. 3, 1956 |
| 2,746,691 | Hoad | May 22, 1956 |
| 2,778,578 | Keith | Jan. 22, 1957 |

FOREIGN PATENTS

| | | |
|---|---|---|
| 930,000 | France | July 28, 1947 |
| 945,322 | Germany | July 5, 1956 |